United States Patent
Wien et al.

(10) Patent No.: US 12,085,435 B2
(45) Date of Patent: Sep. 10, 2024

(54) PORTIONING DEVICE FOR CHEMICAL GRANULAR MATERIAL

(71) Applicant: AMAZONEN-WERKE H. DREYER SE & CO. KG, Hasbergen (DE)

(72) Inventors: Thomas Wien, Stuhr (DE); Florenz Hilbert, Emsdetten (DE); Stefan Jan Johannaber, Lienen (DE); Florian Stein, Osnabrück (DE); Jan-Henrik Breuer, Warendorf (DE); Stephan Teckemeyer, Lotte (DE); Mario Wessels, Ganderkesee (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 261 days.

(21) Appl. No.: 17/620,099

(22) PCT Filed: May 19, 2020

(86) PCT No.: PCT/EP2020/063921
§ 371 (c)(1),
(2) Date: Dec. 16, 2021

(87) PCT Pub. No.: WO2020/259925
PCT Pub. Date: Dec. 30, 2020

(65) Prior Publication Data
US 2022/0244085 A1    Aug. 4, 2022

(30) Foreign Application Priority Data

Jun. 28, 2019   (DE) .................... 10 2019 117 555.0

(51) Int. Cl.
*G01F 11/24* (2006.01)
*A01C 15/00* (2006.01)
*B65G 29/00* (2006.01)

(52) U.S. Cl.
CPC ............ *G01F 11/24* (2013.01); *A01C 15/003* (2013.01); *A01C 15/006* (2013.01); *B65G 29/00* (2013.01); *B65G 2201/042* (2013.01)

(58) Field of Classification Search
CPC ..... G01F 11/24; A01C 15/003; A01C 15/006; A01C 7/06; A01C 7/18; B65G 29/00; B65G 2201/042
See application file for complete search history.

(56) References Cited

U.S. PATENT DOCUMENTS 2,068,382 A * 1/1937 Kriegbaum ............... A01C 7/04
                                                        222/459
2,975,936 A * 3/1961 Rousek .................... A01C 7/04
                                                        221/265
(Continued)

FOREIGN PATENT DOCUMENTS

DE          832954 C      3/1952
DE         3633955 A1     5/1987
(Continued)

OTHER PUBLICATIONS

Office Action in related Eurasian patent application 202290134 dated Sep. 22, 2022 and issued by the Eurasian Patent Office, translation enclosed, all references cited were previously cited.
(Continued)

*Primary Examiner* — Donnell A Long
(74) *Attorney, Agent, or Firm* — Hassan Abbas Shakir; Shakir Law PLLC (57) ABSTRACT

A portioning device for chemical granular material, in particular fertilizer, having an inlet opening for granules, an outlet opening for discharging granule portions produced from the granules and at least one rotationally drivable
(Continued)

conveying element which is designed to combine granules fed to the portioning device to give granule portions during a rotational movement.

13 Claims, 6 Drawing Sheets

(56) References Cited

U.S. PATENT DOCUMENTS

| | | | | |
|---|---|---|---|---|
| 3,347,426 | A * | 10/1967 | Morrison, Jr. | A01C 7/08 222/623 |
| 3,348,504 | A * | 10/1967 | Fischer | A01C 7/04 111/184 |
| 3,638,829 | A * | 2/1972 | Frase | A01C 7/04 221/241 |
| 3,796,346 | A * | 3/1974 | Ribouleau | A01C 7/046 221/211 |
| 4,450,979 | A * | 5/1984 | Deckler | A01C 7/046 222/352 |
| 5,027,725 | A * | 7/1991 | Keeton | A01C 7/04 111/184 |
| 6,173,664 | B1 * | 1/2001 | Heimbuch | A01C 7/04 111/178 |
| 6,247,417 | B1 * | 6/2001 | Heimbuch | A01C 7/04 111/178 |
| 6,481,647 | B1 * | 11/2002 | Keaton | A01C 7/044 239/668 |
| 8,061,281 | B1 | 11/2011 | Drouhard | |
| 8,371,240 | B2 * | 2/2013 | Wollenhaupt | A01C 21/005 111/185 |
| 8,720,352 | B2 * | 5/2014 | Logan | A01C 5/064 111/178 |
| 10,952,368 | B2 * | 3/2021 | Horsch | A01C 7/12 |
| 11,071,243 | B2 * | 7/2021 | Kirkland | A01C 7/08 |
| 11,770,995 | B2 * | 10/2023 | Garner | A01C 7/20 111/11 |
| 2015/0163990 | A1 * | 6/2015 | Audigie | A01C 7/046 111/185 |
| 2015/0163991 | A1 | 6/2015 | Funck | |

FOREIGN PATENT DOCUMENTS

| | | | |
|---|---|---|---|
| DE | 29623398 U1 | 4/1998 | |
| DE | 102012105048 A1 | 12/2013 | |
| DE | 102015112813 A1 * | 2/2017 | A01C 7/04 |
| EP | 1825737 B1 | 4/2012 | |
| EP | 2550850 A1 | 1/2013 | |
| WO | 2005011358 A1 | 2/2005 | |
| WO | 2015035161 A1 | 3/2015 | |
| WO | WO-2017032691 A1 * | 3/2017 | A01C 7/04 |

OTHER PUBLICATIONS

Translation of the Written Opinion of the International Searching Authority in related PCT patent application PCT/EP2020/063921 having a mailing date Aug. 25, 2019, 8 pgs., in English, all references cited were previously cited, document also serves as international preliminary report on patentability.

International Search Report issued by the European Patent Office on Aug. 25, 2020 in related patent application PCT/EP2020/063921, official translation provided.

Written Opinion by the International Searching Authorityt issued by the European Patent Office and uploaded on Dec. 30, 2020 to WIPO Patentscope in related patent application PCT/EP2020/063921, official translation provided.

Office Action issued by the German Patent Office (DPMA) on Mar. 16, 2020 in related patent application DE 10 2019 117 555.0, machine translation provided.

Internal Search Report issued by the European Patent Office on Aug. 25, 2020 in related patent application PCT/EP2020/063921, official translation provided.

Written Opinion by the Internal Searching Authority issued by the European Patent Office and uploaded on Dec. 30, 2020 to WIPO Patentscope in related patent application PCT/EP2020/063921, official translation provided.

Office Action in related Canadian Patent Application 3,143,890 prepared by the Canadian Intellectual Property Office dated Jul. 27, 2023, 4 pgs.

Office Action of related Eurasian Patent Application No. 202290134 issued by the Euroasian Patent Office and dated Apr. 13, 2023, 2 pgs, translation provided.

* cited by examiner

PORTIONING DEVICE FOR CHEMICAL GRANULAR MATERIAL

BACKGROUND OF THE INVENTION

1. Field of the Invention

The invention is directed to a portioning apparatus for chemical granulate, to an agricultural spreading machine and to a method for generating granulate portions.

2. Discussion of the Related Art

During the sowing of some plant varieties, such as corn, for example, fertilizer is spread at the same time, in order to increase the plant growth and thus achieve an increase of yield. In this connection, it has been common practice heretofore, especially for row crops, to deposit the fertilizer in bands along the rows onto the soil of the agricultural land surface. In contrast to this, however, the seed grains of a row are deposited in a manner uniformly spaced apart from one another. The spacing between the deposited seed grains may be, for example, 15 cm. Due to the spacing, a relatively large proportion of the fertilizer deposited in bands cannot be reached by the plants, at least in the germination phase, since the root system has not yet developed sufficiently.

In order to improve the accessibility of the deposited fertilizer for the germinating plants, delivery apparatuses for depositing fertilizers in portions close to a seed grain are known in the prior art. For example, a corresponding system is known from the publication EP 1,825,737 B1.

These and other known solutions for deposition of chemical granulate in portions on an agricultural land surface do permit delivery of the granulate, but they do so only at a limited ground speed and/or they lead frequently to inadvertent disproportioning of the granulate.

SUMMARY OF THE INVENTION

The object underlying the invention therefore consists in overcoming, at least partly, the known disadvantages during deposition of chemical granulate in portions on an agricultural land surface.

The object is achieved by a portioning apparatus of the type mentioned in the introduction, wherein the inventive portioning apparatus has at least one conveying element that can be driven in rotation and is set up to bring the granules introduced into the portioning apparatus together as granulate portions during a rotational movement.

The invention makes use of the knowledge that, by means of a conveying element that can be driven in rotation, it is possible to implement, for forming granulate portions, a purely mechanical system, which generates granulate portions not with an electromechanical closing device that has to be controlled, such as an electrically pulsing valve, for example, but instead by the kinematics of a conveying element. Moreover, via the speed of rotation of the conveying element and/or via the number of conveying elements, the frequency of preparation of the granulate portions may be precisely adjusted, wherein even relatively high preparation frequencies can be implemented. This permits the spreading of uniformly spaced granulate portions even at high ground speeds. For example, the preparation frequency may be between 7 and 40 hertz.

One granulate portion comprises a multiplicity of granules. The granules can be introduced into the portioning apparatus via a conveying air stream that entrains the granules. In this case, the outlet opening serves to dispense granulate portions generated from the granules entrained by the conveying air stream. The at least one conveying element is set up in this case to bring the granules entrained by the conveying air stream together as granulate portions during a rotational movement. The conveying air stream that entrains the granules and is introduced via the inlet opening into the portioning apparatus is preferably a continuous mixed flow of air and granulate and/or a volumetrically dosed mixed flow of air and granulate.

Alternatively, the granules may drop also gravitationally into the portioning apparatus, without the need to generate a conveying air stream.

In a preferred embodiment, the inventive portioning apparatus comprises a housing, inside which a portioning chamber is disposed, wherein the conveying element that can be driven in rotation is disposed inside the portioning chamber. The inlet opening and/or the outlet opening of the portioning apparatus are preferably built onto the housing. The housing may be a housing that comprises multiple parts. Preferably, the housing has a cover, which can be removed nondestructively from a housing base. When the cover is removed, the portioning chamber can be made accessible from the outside for cleaning, maintenance or repair purposes. By the fact that the housing of the portioning apparatus can be opened, it is also possible to adapt the configuration of the portioning apparatus to any type of granulate or to the requirements of planned spreading of granulate. For example, the conveying element may be exchangeable, so that different conveying elements may be used for granulate portioning. In this connection, the portioning apparatus may also be equipped with an insert that has several conveying elements. Thus it is also possible to adapt the number of conveying elements to any type of granulate or to the requirements of planned spreading of granulate. The inlet opening is preferably in communication with the portioning chamber via an inlet tube. The outlet opening is preferably in communication with the portioning chamber via an outlet tube. As an example, the portioning chamber may have disk-shaped structure. The conveying air stream that entrains the granules preferably reaches the portioning chamber of the portioning apparatus via a chamber input opening. The chamber input opening is preferably disposed on a lateral front side of the portioning chamber and is oriented in the direction of rotation of the conveying element, so that the conveying air stream can be introduced in the direction of rotation. The generated granulate portions exit the portioning chamber preferably through a chamber output opening. The chamber output opening is preferably disposed on an inner shell surface extending in circumferential direction, wherein the inner shell surface bounds the portioning chamber in radial direction.

In a further development of the inventive portioning apparatus, the conveying element is set up to come into contact with the granules present in the portioning chamber during a rotational movement and to push these granules in front of itself after making contact. Thus the conveying element functions as a pusher, and it collects the granules present in the portioning chamber during a rotational movement. The number of granules that the conveying element pushes in front of itself during the rotational movement increases during its movement between the chamber input opening and the chamber output opening of the portioning chamber.

Furthermore, an inventive portioning apparatus is advantageous in which the conveying element is set up to accelerate granules present in the portioning chamber in rotary manner during a rotational movement. The rotary acceleration is implemented in that the speed of rotation of the conveying element is higher than the speed of movement of the granules present in the portioning chamber. The granules that the conveying element pushes in front of itself are preferably moved on an outwardly directed spiral trajectory, since the centrifugal force moves the entrained granules radially outward. Thus the granules accumulate at the wall radially bounding the portioning chamber, so that a granulate portion is formed there or an already existing granulate portion becomes larger. The granules pushed by the conveying element are therefore squeezed together in outward direction by the centrifugal force. The granules are then guided between the wall radially bounding the portioning chamber and the front faces laterally bounding the portioning chamber and are moved in rotary manner by the conveying element.

In a further preferred embodiment of the inventive portioning apparatus, the portioning chamber is bounded in radial direction by a wall of the housing that at least partly encircles the axis of rotation of the conveying element. The wall forms an inner shell surface, by which a granulate portion is guided at least in sections during the rotational movement of the conveying element. The chamber output opening, via which the granulate portions exit the portioning chamber, is formed in the wall bounding the portioning chamber in radial direction. Thus the conveying element accelerates the granulate portions outwardly in tangential direction from the portioning chamber.

Moreover, an inventive portioning apparatus is advantageous in which the conveying element is elongated and/or is formed as a blade extending radially outward. The portioning apparatus may also have several conveying elements, each of which may be formed, for example, as outwardly extending blades. The several conveying elements extending radially outwardly may be disposed around a common drive axis, especially in a star configuration. Via the number of conveying elements, the frequency of preparation of the granulate portions may be varied without adapting the speed of rotation of the conveying elements. For example, the conveying elements may be components of a multi-bladed rotor, which can be driven in rotation via a drive device.

An inventive portioning apparatus is further preferred in which the conveying element comprises multiple parts and/or is formed at least in sections from an elastically deformable material. Preferably the conveying element has a contact face, which during rotation comes into contact with the granules present in the portioning chamber. The contact face is preferably formed from the elastically deformable material, so that the tendency of the granules to bounce off from the conveying element is reduced. In this way, the packing density of the granulate portion can be increased and the risk of breaking away from the granulate portion is reduced.

In a further embodiment of the inventive portioning apparatus, the conveying element comprises a deformable body, especially a deformable robber body. The deformable body preferably carries the contact face of the conveying element that comes into contact with the granules during a rotational movement of the conveying element. The rubber body is long-lived and robust against external stress and strain, and it leads to a considerable reduction of the tendency of the granules to bounce off. Preferably the deformable body bears, during the rotational movement of the conveying element, on the wall radially bounding the portioning chamber, at least along a range of angle of rotation. In this way the granulate portion is guided without play and is sealed against the wall. Furthermore, gap formation is prevented, since the elastic body always bears on the wall radially bounding the portioning chamber.

An inventive portioning apparatus is further advantageous that has a drive device. The drive device is set up to drive the conveying element in rotation. The drive device may be an electric, hydraulic or pneumatic drive device. Preferably the drive device is designed as an electric motor or comprises an electric motor. The drive device may be coupled with a control device, via which the rotational frequency can be adjusted. The drive device is preferably fastened on the housing of the portioning apparatus. The drive device preferably has a drive shaft, wherein the conveying element is fastened on the drive shaft.

The object underlying the invention is further achieved by an agricultural spreading machine of the type mentioned in the introduction, wherein the at least one portioning apparatus of the inventive agricultural spreading machine is designed according to one of the embodiments described in the foregoing. As regards the advantages and modifications of the inventive agricultural spreading machine, reference is made firstly to the advantages and modifications of the inventive portioning apparatus.

The conveying device may be designed to generate a conveying air stream to entrain granules and, for example, may comprise a blower, by means of which the conveying air stream can be generated. Chemical granulate from the storage hopper will then be fed to the conveying air stream, so that the conveying air stream entraining the granules is obtained. The portioning apparatus can be designed to generate granulate portions generated from the granules entrained by the conveying air stream.

The agricultural spreading machine is preferably set up to deposit granulate portions having a portion length between 3 cm and 6 cm, especially between 4 cm and 5 cm, on the agricultural land surface. The agricultural spreading machine is preferably set up to deposit granulate portions having a portion width between 1 cm and 3 cm, especially granulate portions having a portion width of approximately 2 cm, on the agricultural land surface.

Preferably the agricultural spreading machine comprises a dosing device, by means of which the granulate quantity fed to the portioning apparatus can be adjusted. The granulate quantity and the size of a granulate portion can be adjusted via the granulate quantity fed to the portioning apparatus.

The object underlying the invention is further achieved by a method of the type mentioned in the introduction, wherein the granules introduced into the portioning apparatus are brought together as granulate portions during the inventive method by means of at least one conveying element of the portioning apparatus that is driven in rotation.

Preferably the granules are introduced into the portioning apparatus via a conveying air stream that entrains the granules. Preferably the granules entrained by the conveying air stream are brought together as granulate portions by means of the conveying element. Alternatively, the granules may drop gravitationally into the portioning apparatus, without the need to generate a conveying air stream.

Preferably a portioning apparatus according to one of the embodiments described in the foregoing is used to execute the inventive method.

The inventive method may further comprise the diversion of the granulate portions out of the portioning apparatus, especially out of the granules entrained by the conveying air stream.

The inventive method is further advantageously developed in that the granules, especially the conveying air stream entraining the granules, is introduced into a portioning chamber of the portioning apparatus inside which the conveying element executes a rotational movement. Alternatively or additionally, the granules present in the portioning chamber are pushed by the rotating conveying element, especially along a conveying trajectory that at least partly encircles the axis of rotation of the conveying element. The granules present in the portioning chamber are preferably accelerated in rotational manner by the rotating conveying element. In particular, the granulate portions are accelerated outwardly from the portioning chamber of the portioning apparatus in the direction of an outlet opening of the portioning apparatus. While the granules present in the portioning chamber are being pushed by the rotating conveying element, the granules present in the portioning chamber come into contact with the conveying element and the conveying element pushes the granules in front of itself after making contact. Due to rotational acceleration of the granules present in the portioning chamber, these are moved radially outward by centrifugal force, so that the granules accumulate at the wall radially bounding the portioning chamber, where they form granulate portions or enlarge already existing granulate portions. The granulate portion is then guided by the combination of the conveying element and the inner shell surface of the housing, before it is accelerated outwardly from the portioning chamber. The outward acceleration of the granulate portions from the portioning chamber is preferably implemented through a chamber output opening in the wall radially bounding the portioning chamber, which opening is interrupted by the wall and thus permits the outward acceleration. The granulate portions are preferably accelerated outward in tangential direction from the portioning chamber.

In a further preferred embodiment of the inventive method, the speed of rotation of the conveying element is higher than the speed of movement of the granules introduced into the portioning chamber. In this way the conveying element is able, during a rotational movement, to pick up and push the granules introduced into the portioning chamber, so that the granules are brought together.

Moreover, an inventive method is advantageous in which the impingement of the granules on the conveying element is damped by means of an elastically deformable contact face of the conveying element. The contact face of the conveying element comes into contact with the granules present in the portioning chamber during the rotational movement of the conveying element. The elastically deformable contact face of the conveying element may be, for example, a component of a rubber body of the conveying element.

BRIEF DESCRIPTION OF THE DRAWINGS

Preferred embodiments of the invention will be explained and described in more detail hereinafter with reference to the attached drawings, wherein.

DETAILED DESCRIPTION OF THE INVENTION

Figure 1:
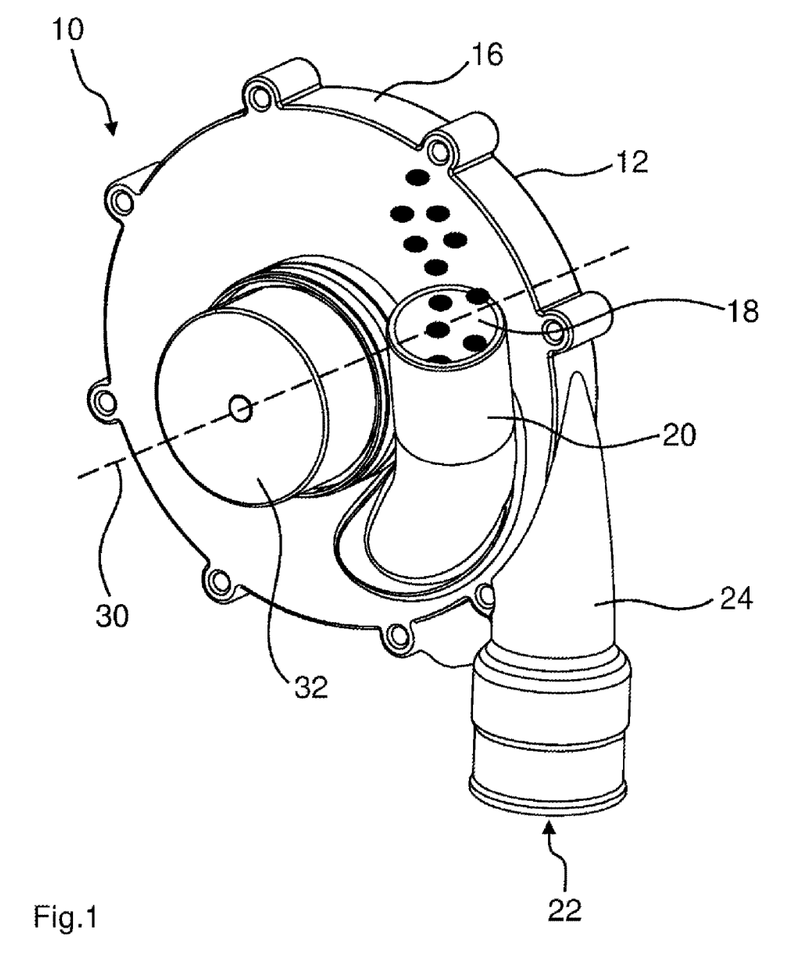
FIG. 1 shows an exemplary embodiment of the inventive portioning apparatus in a perspective diagram.

FIG. 1 shows a portioning apparatus 10 for chemical granulate, especially for fertilizers. The illustrated portioning apparatus 10 may be, for example, a component of an agricultural spreading machine, by means of which chemical granulate can be deposited on an agricultural land surface. A corresponding spreading machine has, for example, a storage hopper for the granulate, wherein the storage hopper is in communication with a conveying device. The conveying device may comprise a blower and be designed to generate a conveying air stream that entrains granules 100. Portioning apparatus 10 serves to generate granulate portions 102 from granules 100 entrained by the conveying air stream. A corresponding agricultural spreading machine further has a depositing device for depositing generated granulate portions 102 on the agricultural land surface.

Portioning apparatus 10 has a housing 12 comprising multiple parts and made of plastic. Housing 12 comprises a housing base 16, the inner region of which is closed by means of a cover. Housing base 16 and the cover may be fastened to one another in nondestructively detachable manner. Fastening elements such as screws may be used for fastening the cover to housing base 16.

Housing 12 comprises an inlet opening 18, which is disposed on a front end of an inlet tube 20. The conveying air stream that entrains granules 100 can be introduced into portioning apparatus 10 via inlet opening 18. Via inlet tube 20, the conveying air stream entraining granules 100 is fed to a portioning chamber 26, which is disposed inside housing 12.

A conveying element 28 driven in rotation is disposed inside portioning chamber 26 and is set up to bring granules 100 entrained by the conveying air stream together as granulate portions 102 during a rotational movement. The rotary drive of conveying element 28 is provided in this case via a drive device 32 designed as an electric motor. During operation of portioning apparatus 10, conveying element 28 executes a rotational movement around axis of rotation 30.

Portioning chamber 26 present in housing 12 is in communication via an outlet opening 22 with an outlet tube 24. Outlet opening 22 serves to dispense granulate portions 102 generated inside portioning chamber 26.

Portioning apparatus 10 therefore represents a mechanical system for forming granulate portions 102. Corresponding granulate portions 102 respectively comprise a multiplicity of granules 100. The conveying air stream entraining granules 100 introduced into the portioning apparatus is a continuous mixed flow of air and granulate. The granulate is dosed volumetrically to an air stream. The quantity of granulate injected into the air stream can be adjusted via a dosing device of the spreading machine.

Portioning apparatus 10 permits the preparation of granulate portions with a frequency in the range of 7 to 40 hertz.

FIGS. 2 to 6 show a portioning apparatus 10 without cover during granulate portioning. By virtue of the missing cover, portioning chamber 26 disposed inside housing 12 is visible. Portioning chamber 26 has a disk-like basic shape.

Portioning chamber 26 is in communication with an inlet tube 20 via a chamber input opening 34. Chamber input opening 34 is disposed on a lateral front side of portioning chamber 26. Furthermore, portioning chamber 26 is in communication with an outlet tube 24 via a chamber output opening 36. Chamber output opening 36 is formed in a wall 40 radially bounding portioning chamber 26. Wall 40 is an inner shell surface, which extends in circumferential direction and passes around a circular path. By virtue of the arrangement of chamber output opening 36 in wall 40, generated granulate portions 102 are accelerated outward in tangential direction from portioning chamber 26.

Conveying element 28 is elongated and comprises multiple parts. Furthermore, conveying element 28 is formed as a blade extending radially outward. Conveying element 28 has a contact face 42, which comes into contact with granules 100 present in portioning chamber 26 during a rotational movement of conveying element 28. Contact face 42 is carried by an elastically deformable rubber body 38. Rubber body 38 reduces the tendency of granules 100 to bounce off when they come into contact with conveying element 28.

Figure 2:
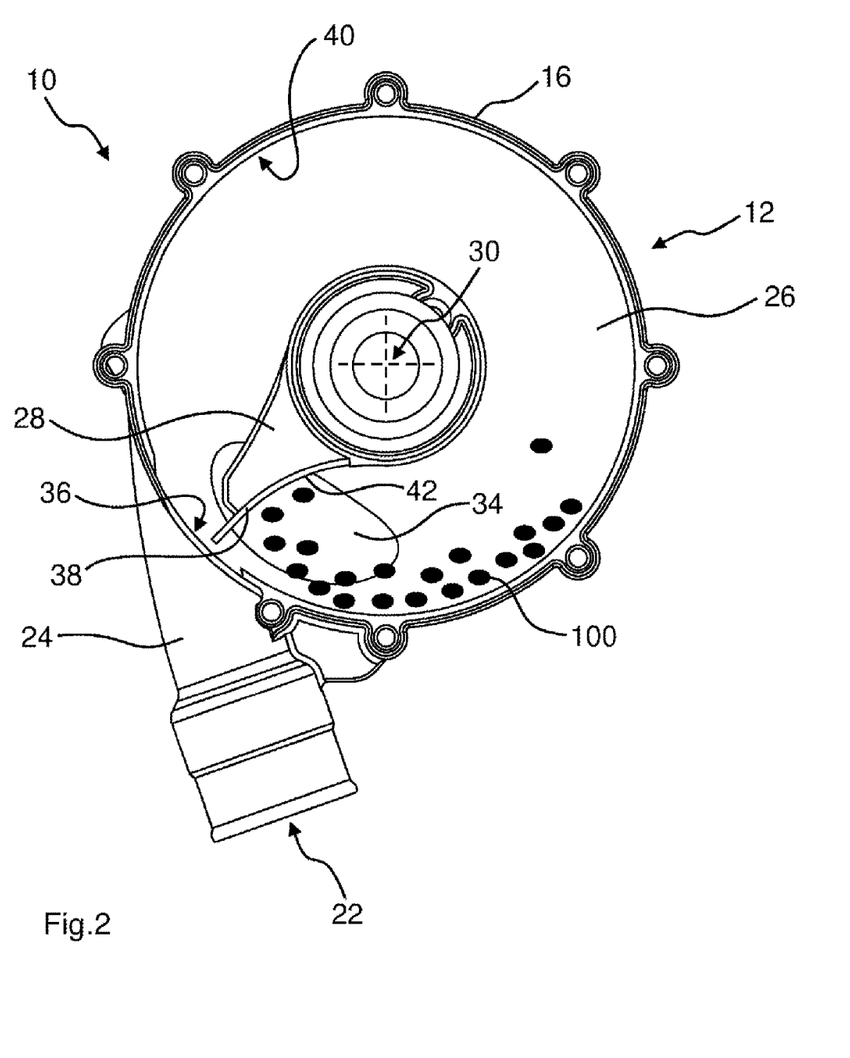
FIG. 2 shows an exemplary embodiment of the inventive portioning apparatus during granulate portioning in a first condition in a sectional diagram viewed from the side.

In the condition illustrated in FIG. 2, conveying element 28 is situated at the height of an upper section of chamber inlet opening 34. Granules 100 introduced into portioning chamber 26 via the conveying air stream are located in front of conveying element 28 in the direction of rotation. Conveying element 28 is moved by drive device 32 in such a way that the granules introduced into portioning chamber 26 are picked up by conveying element 28 and thus come into contact with conveying element 28 inside portioning chamber 26.

Figure 3:
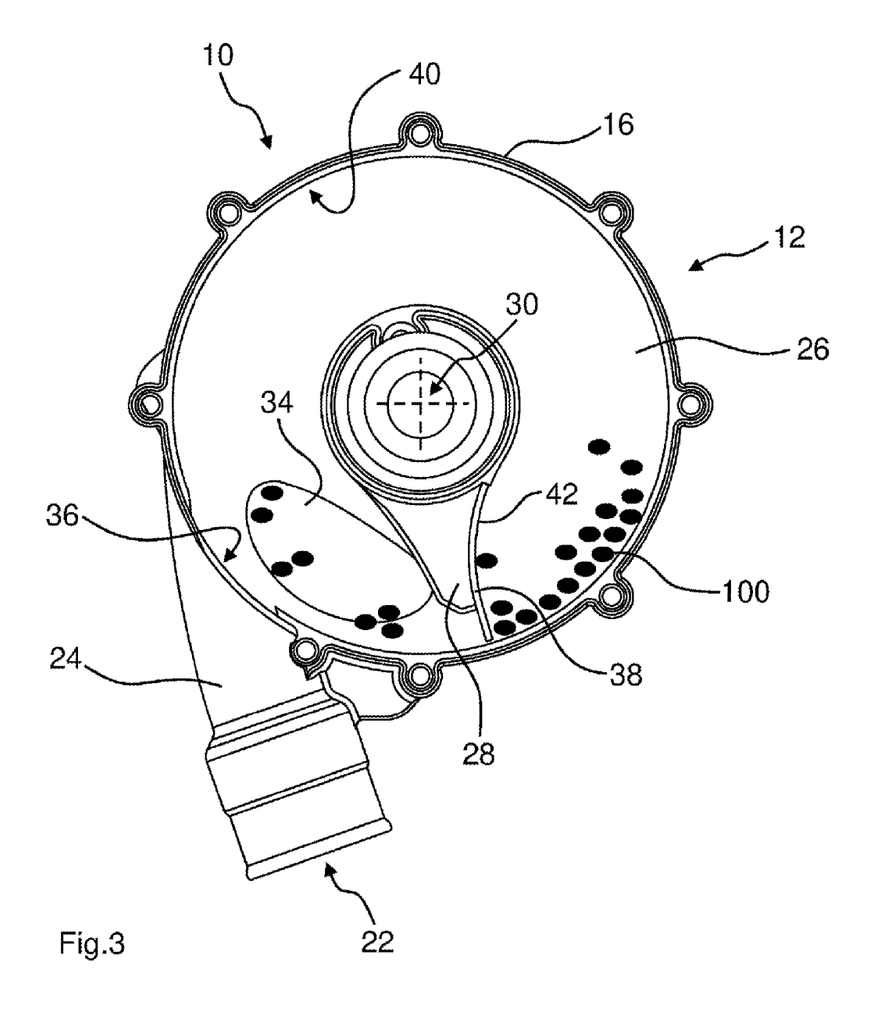
FIG. 3 shows the portioning apparatus depicted in FIG. 2 during granulate portioning in a second condition in a sectional diagram viewed from the side.

FIG. 3 shows how some granules 100 have already been picked up by conveying element 28 and are being pushed in front of conveying element 28 after having made contact with conveying element 28. Conveying element 28 accelerates picked-up granules 100 rotationally, so that granulate grains 100 are moved radially outward by centrifugal force. Granules 100 collected by conveying element 28 are thus moved on an outwardly directed spiral trajectory.

Figure 4:
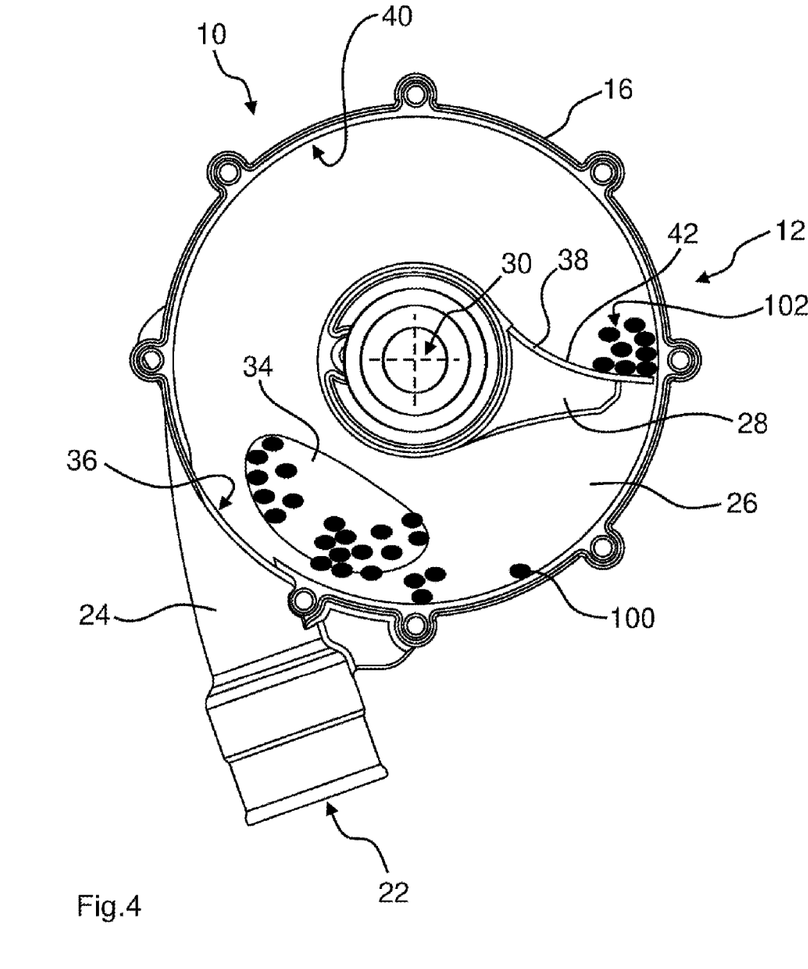
FIG. 4 shows the portioning apparatus depicted in FIG. 2 during granulate portioning in a third condition in a sectional diagram viewed from the side.

FIG. 4 shows that granules 100 being moved radially outward by centrifugal force accumulate at wall 40 radially bounding portioning chamber 26 and form granulate portions 102 there. Granules 100 pushed by conveying element 28 are therefore squeezed together in outward direction by centrifugal force. Granulate portion 102 is then guided by the combination of conveying element 28 and the inner shell surface of housing 12.

Figure 5:
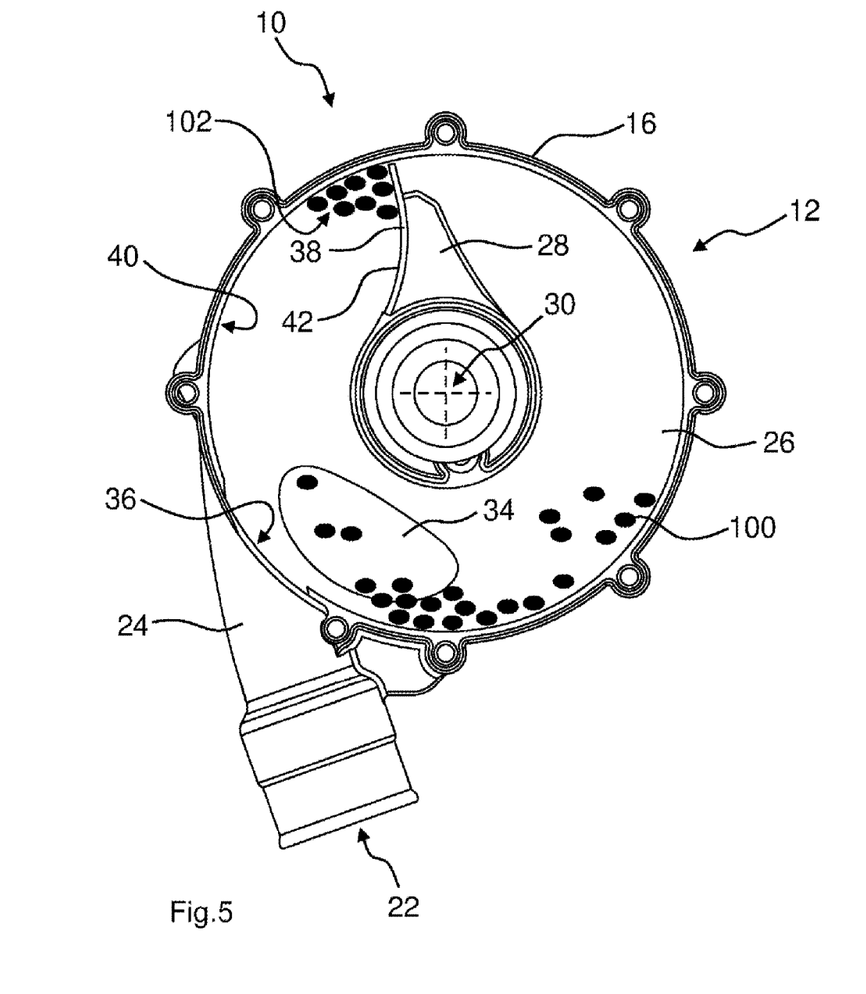
FIG. 5 shows the portioning apparatus depicted in FIG. 2 during granulate portioning in a fourth condition in a sectional diagram viewed from the side.

FIG. 5 shows that granulate portion 102 on wall 40 radially bounding portioning chamber 26 is pushed in front of conveying element 28, before granulate portion 102 is accelerated outward in tangential direction from portioning chamber 26 at the height of chamber output opening 36.

Figure 6:
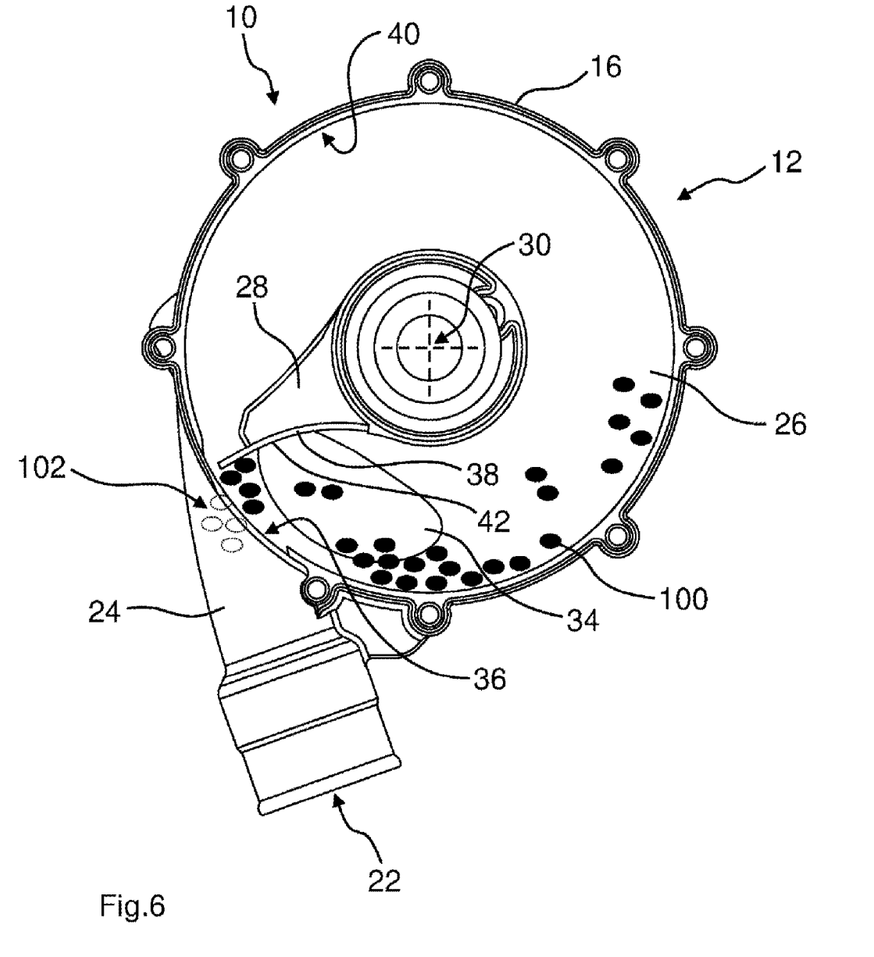
FIG. 6 shows the portioning apparatus depicted in FIG. 2 during granulate portioning in a fifth condition in a sectional diagram viewed from the side.

The outward acceleration of granulate portion 102 from portioning chamber 26 is illustrated in FIG. 6. Granulate portion 102 accelerated outward from portioning chamber 26 then exits portioning apparatus 10 via outlet opening 22 disposed at the front end of outlet tube 24.

During generation of granulate portions 102 by means of conveying element 28, new granules 100 have already been introduced via the conveying air stream into portioning chamber 26. Granules 100 introduced into portioning chamber 26 in the meantime are brought together as a granulate portion 102 during the next revolution of conveying element 28.

Alternatively to the illustrated embodiment, portioning apparatus 10 may also have several conveying elements 28, which may be formed, for example, as blades extending outwardly in radial direction. The multiple conveying elements 28 may be disposed, for example, in star configuration around axis of rotation 30 and be driven by a common drive device 32.

REFERENCE SYMBOLS

10 Portioning apparatus
12 Housing
16 Housing base
18 Inlet opening
20 Inlet tube
22 Outlet opening
24 Outlet tube
26 Portioning chamber
28 Conveying element
30 Axis of rotation
32 Drive device
34 Chamber input opening
36 Chamber output opening
38 Rubber body
40 Wall
42 Contact face
100 Granules
102 Granulate portion

What is claimed is:

1. An agricultural spreading machine comprising:
a storage hopper for storing chemical granules; and
a portioning apparatus for generating granulate portions generated from the granules,
a conveying device that conveys the granules from the storage hopper into the portioning apparatus, wherein the conveying device generates a conveying air stream entraining the granules and comprises a blower to generate the conveying air stream;
a dosing device that adjusts a granulate quantity fed to the portioning apparatus;
a depositing device that deposits the generated granulate portions onto an agricultural land surface;
wherein the portioning apparatus includes an inlet opening for the granules and an outlet opening to dispense granulate portions generated from the granules and a rotationally driven conveying element is configured to bring the granules introduced into the portioning apparatus together as granulate portions during a rotational movement,
wherein the granulate quantity and a size of a granulate portion is adjusted via the granulate quantity fed to the portioning apparatus;
wherein the portioning apparatus comprises a housing, inside which a portioning chamber is disposed, wherein the conveying element is disposed inside the portioning chamber and the portioning chamber is connected to an inlet channel via a chamber inlet opening and the conveying air stream entraining the granules is conveyed via the chamber inlet opening into the portioning chamber; and
wherein the chamber inlet opening is arranged at a lateral end face of the portioning chamber and is aligned in a direction of rotation of the conveying element, so that the conveying air stream is introduced into the portioning chamber in the direction of rotation of the conveying element.

2. The agricultural spreading machine according to claim 1, wherein the conveying element of the portioning apparatus comes into contact with the granules present in the portioning chamber during a rotational movement and the conveying element pushes the granules in front of itself after making said contact.

3. The agricultural spreading machine according to claim 1, wherein the conveying element is configured to accelerate granules present in the portioning chamber in a rotary manner during a rotational movement.

4. The agricultural spreading machine according to claim 1, wherein the portioning chamber of the portioning apparatus is bounded in radial direction by a wall of the housing that at least partly encircles the axis of rotation of the conveying element.

5. The agricultural spreading machine to claim 1, wherein the conveying element of the portioning apparatus is elongated or is formed as a blade extending radially outward.

6. The agricultural spreading machine according to claim 1, wherein the conveying element of the portioning apparatus comprises multiple pieces from an elastically deformable material.

7. The agricultural spreading machine according to claim 1, wherein the conveying element of the portioning apparatus comprises a deformable body.

8. The agricultural spreading machine according to claim 7, wherein the deformable body comprises a deformable rubber body.

9. The agricultural spreading machine according to claim 1, wherein the portioning apparatus comprises a drive device configured to drive the conveying element in rotation.

10. A method for generating granulate portions using the portioning apparatus of an agricultural spreading machine, the portioning apparatus comprising
    housing inside which a portioning chamber is disposed, wherein the conveying element that is driven in rotation is disposed inside the portioning chamber and the portioning chamber is connected to an inlet channel via a chamber inlet opening and the conveying air stream entraining the granules is conveyed via the chamber inlet opening into the portioning chamber; and
    wherein the chamber inlet opening is arranged at a lateral end face of the portioning chamber and is aligned in a direction of rotation of the conveying element, so that the conveying air stream is introduced into the portioning chamber in the direction of rotation of the conveying element;
the method comprising the steps of:
    conveying granules from a storage hopper into the portioning apparatus by a conveying device, the conveying device generating a conveying air stream entraining the granules and comprising a blower to generate the conveying air stream;
    bringing the granules introduced into the portioning apparatus together as granulate portions by a conveying element of the portioning apparatus that is driven in rotation; and
    adjusting an amount of the granules fed to the portioning apparatus by a dosing device of the agricultural spreading machine;
    wherein a granule quantity and size of a granule portion are adjusted via the granule quantity supplied to the portioning apparatus.

11. The method according to claim 10, further comprising the steps of:
    pushing the granules present in the portioning chamber by a rotating conveying element along a conveying trajectory that at least partly encircles an axis of rotation of the conveying element;
    acceleration of the granules present in the portioning chamber in rotational manner by the rotating conveying element, and
    outward acceleration of the granulate portions from the portioning chamber of the portioning apparatus in the direction of an outlet opening of the portioning apparatus.

12. The method according to claim 10, wherein the speed of the rotational movement of the conveying element is higher than a speed of movement of the granules introduced into the portioning chamber.

13. The method according to claim 10, wherein the impingement of the granules on the conveying element is damped by an elastically deformable contact face of the conveying element.

* * * * *